United States Patent [19]

Takehara et al.

[11] Patent Number: 5,391,954
[45] Date of Patent: Feb. 21, 1995

[54] DIRECT CURRENT MOTOR

[75] Inventors: Isamu Takehara; Masaya Kawamura, both of Tokyo, Japan

[73] Assignee: Seiko Instruments Inc., Japan

[21] Appl. No.: 137,482

[22] Filed: Oct. 15, 1993

[51] Int. Cl.6 .......................... H02K 5/02; H02K 1/12
[52] U.S. Cl. .................. 310/89; 310/40 MM; 310/254
[58] Field of Search ............ 310/40 MM:89, 156, 179, 310/180, 254, 256, 258, DIG. 6

[56] References Cited

U.S. PATENT DOCUMENTS

| | | | |
|---|---|---|---|
| 4,130,769 | 12/1978 | Karube | 310/179 |
| 4,403,401 | 9/1983 | Rosenberry | 310/254 |
| 4,665,331 | 5/1987 | Sudo et al. | 310/40 MM |
| 4,733,118 | 3/1988 | Mihalko | 310/254 |
| 4,908,347 | 3/1990 | Denk | 310/254 |
| 4,954,739 | 9/1990 | Schultz et al. | 310/254 |
| 5,243,248 | 9/1993 | Benford et al. | 310/256 |

FOREIGN PATENT DOCUMENTS

| | | | |
|---|---|---|---|
| 1136200 | 11/1982 | Canada | 310/254 |
| 0167638 | 8/1985 | Japan | 310/259 |
| 0314154 | 12/1988 | Japan | 310/258 |
| 9111842 | 8/1991 | WIPO | 310/254 |
| 92/002068 | 2/1992 | WIPO | 310/254 |

Primary Examiner—Steven L. Stephan
Assistant Examiner—Clayton E. LaBalle
Attorney, Agent, or Firm—Bruce L. Adams; Van C. Wilks

[57] ABSTRACT

In a stationary coil type direct current motor, the motor comprises a case supported by a shaft, and the case is made of magnetic material being high saturation magnetic flux density and high magnetic permeability, whereby magnetic saturation and iron loss can be reduced. The motor is further provided with a plurality of coils mounted on the inner circumference of the case, and the shaft on which a magnet is secured. The magnet is arranged so as to be spaced a predetermined gap from the coils. Furthermore, the case may be a less iron loss material constructed of two layers. A plurality of coils ace mounted on the inner circumference of the case, and the magnet secured to the shaft is spaced a predetermined gap from the coils.

16 Claims, 6 Drawing Sheets

DIRECT CURRENT MOTOR

BACKGROUND OF THE INVENTION

This invention relates to a stationary coil type direct current motor comprising a case made of a magnetic material characterized by a high saturation magnetic flux density and a high permeability and a plurality of coils.

FIG. 9 is a sectional view of a conventional stationary coil type direct current motor. FIG. 10 is a plane view of the conventional stationary coil type direct current motor.

Flanges 5 and 6 are fixed to a case 1. Bearings 7 are fixed to the flange 5 and flange 6. A shaft 4 is supported by the bearings 7. A laminated silicon steel plate 11 is fixed to the inner circumference surface of the case 1. A coil 2 is wound and arranged on the inner circumference surface of the laminated silicon steel plate. A magnet 3 is secured to the shaft 4 and spaced from the coil 2 to define an annular space between the magnet 3 and the coil 2.

However, the conventional direct current motor has the following disadvantages.

1) It is difficult to machine and assemble the laminated silicon steel plate for down sizing of the motor.

2) In view of the construction of the motor, since eliminating the laminated silicon steel plate causes increasing of iron loss of the soft magnetic material forming the magnetic circuit, a motor efficiency will be deteriorated.

SUMMARY OF THE INVENTION

It is therefore an object of the present invention to provide a high efficient direct current motor with less iron loss, which is small in size and has no laminated silicon steel plate.

To overcome the above problems, a stationary coil type direct current motor according to the present invention comprises a cylindrical case made of a magnetic material characterized by a high saturation magnetic flux density and a high magnetic permeability, a shaft supported by said case, a magnet secured to said shaft, and a plurality of coils which are fixed to an inner circumference surface of said case and are spaced from said magnet.

In a stationary coil type direct current motor, the motor comprise a case having an Outer layer made of a magnetic material characterized by a high magnetic flux density, that is, the outer layer being made of a material in which a magnetic flux density is not liable to saturate in a strong magnetic field, and an inner layer made of a magnetic material of a high magnetic permeability, that is, a less iron loss material, a shaft supported by said case, a magnet secured to said shaft, and a plurality of coils which are fixed to an inner surface of said case and are spaced from said magnet along the circumference.

In the stationary coil type direct current motor described above, the shaft is supported by the bearings fixed to the case. The case is formed in the form of one or two layers by the use of a magnetic material characterized by a high saturation magnetic flux density and a high magnetic permeability, and the coils are fixed to the inner surface of the case. The magnets are secured to the shaft so as to be spaced an annular space from the coils. As a necessary wiring is effected between the coils, the shaft is rotated when the coils are excited in a prescribed sequence, whereby a rotational operation as a stationary coil type direct current motor is realized.

DETAILED DESCRIPTION OF THE INVENTION

The embodiments of the present invention will be described with reference the attached drawings.

Figure 1:
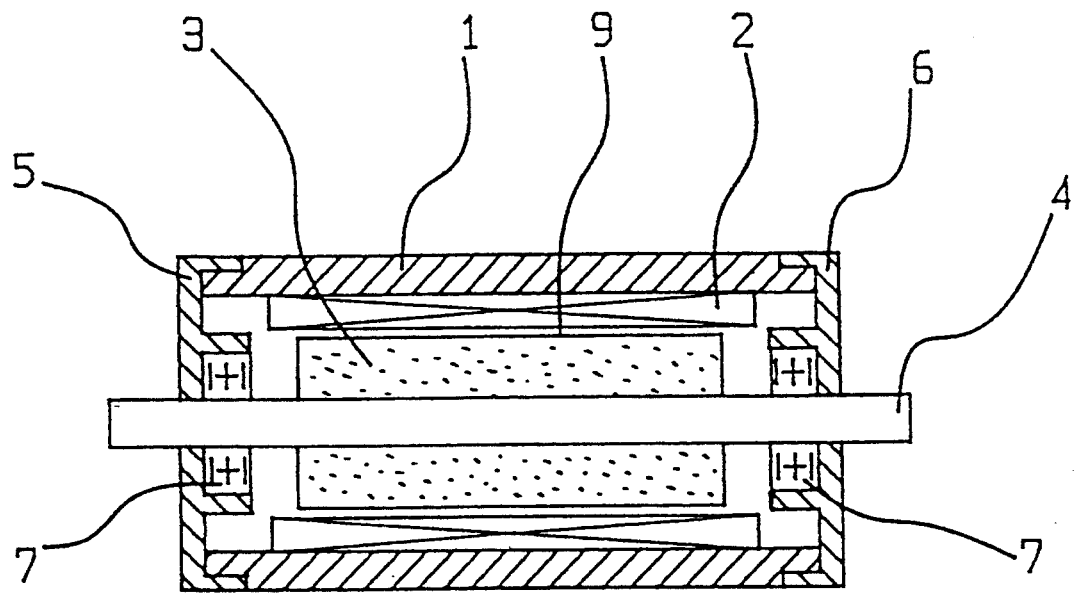
FIG. 1 is a sectional view of a first embodiment of the present invention.
Figure 2:
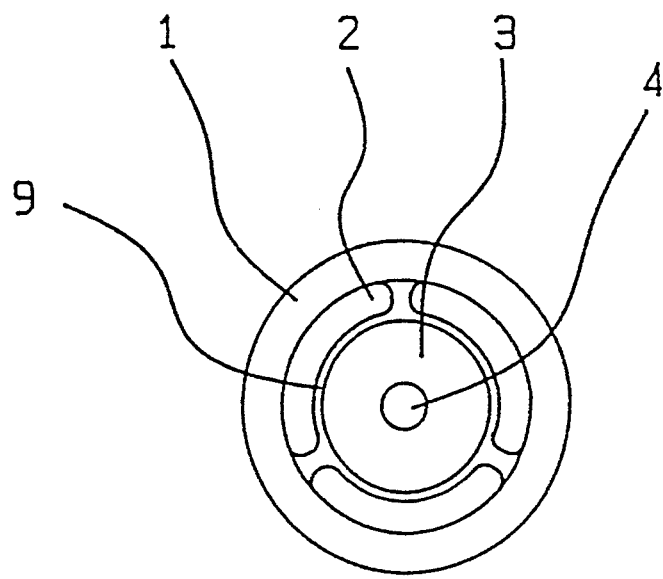
FIG. 2 is a plane view of the first embodiment of the present invention.

FIG. 1 is a sectional view of a first embodiment of the direct current motor of the present invention. FIG. 2 is a plane view of the first embodiment of the direct current motor of the present invention.

In FIGS. 1 and 2, a case 1 is made of a magnetic material characterized by a high saturation magnetic flux density and a high magnetic permeability. Flange 5 and flange 6 are secured to the case 1. Bearings 7 are fixed to the flanges 5 and 6. A shaft 4 is supported by the bearings 7. A set of energizable coils 2 are arranged along the inner circumference of the case 1 and are fixed thereto. A magnet 3 is secured to the shaft 4 so as to define an annular space 9 between the magnet 3 and the coils 12. Three air-core coils wound coaxially are used as the coils 2. The coils may be a plurality of air-core coils wound coaxially or cylindrical air-core coils wound in a distributed winding.

Figure 3:
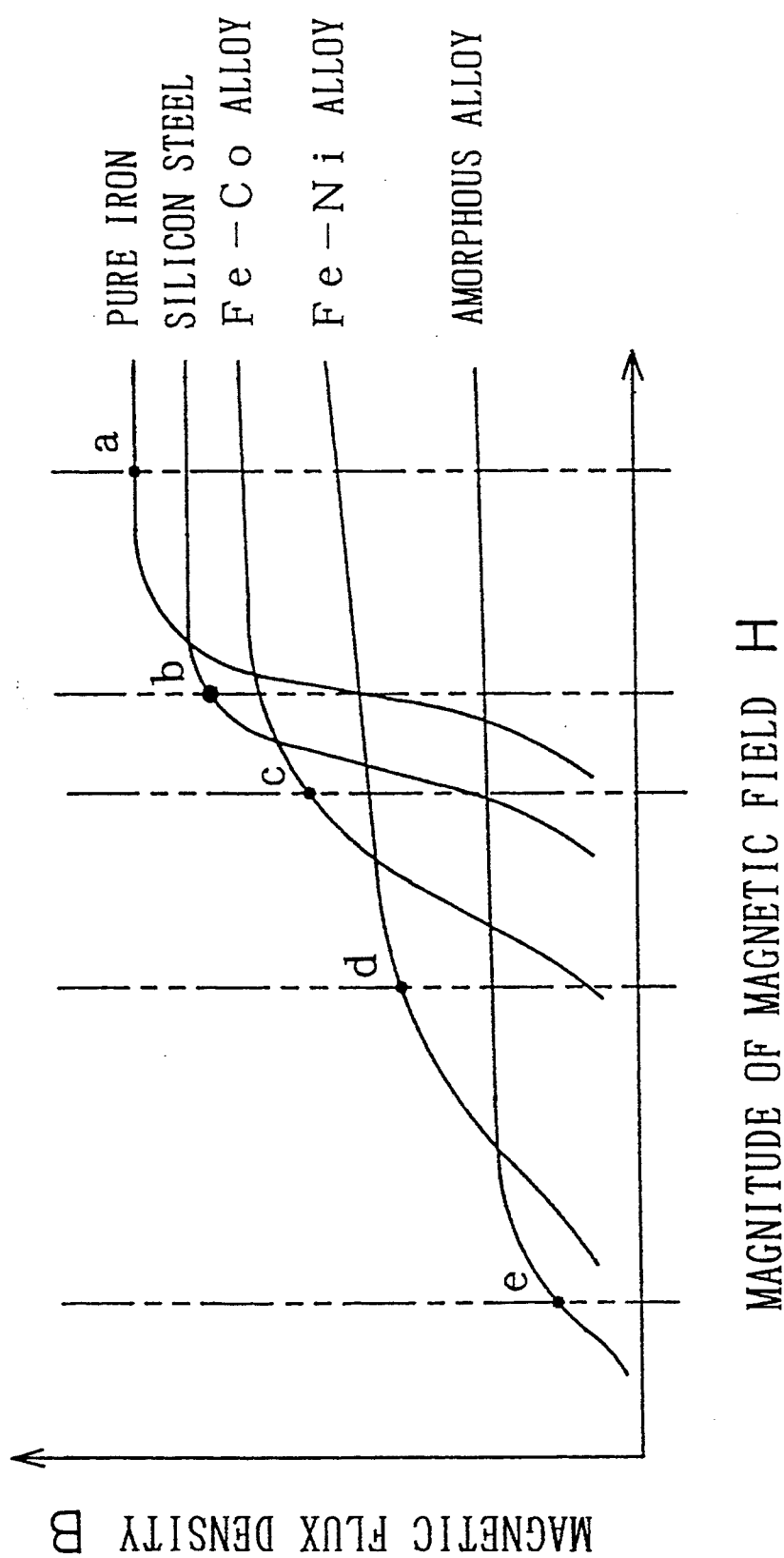
FIG. 3 is a magnetic characteristic curves of the magnetic materials for the first and second embodiments of the direct current motor of the present invention.
Figure 4:
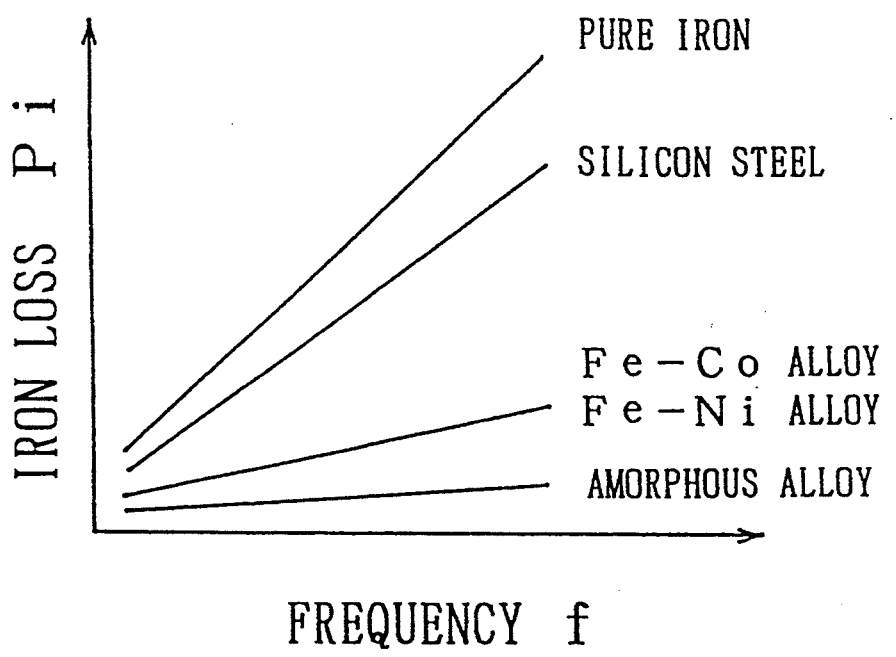
FIG. 4 is a graph showing the relationship between a frequency and an iron loss for the material using the first and second embodiments of the direct current motor according to the present invention.

FIG. 3 shows magnetic characteristic curves of a plurality of magnetic materials. When designing a motor, a high saturation magnetic flux density material is generally selected as the magnetic materials. FIG. 4 is a characteristic curve showing the relationship between a frequency and an iron loss for a plurality of magnetic materials. When designing a motor, it is general to select a low iron loss material.

Figure 5:
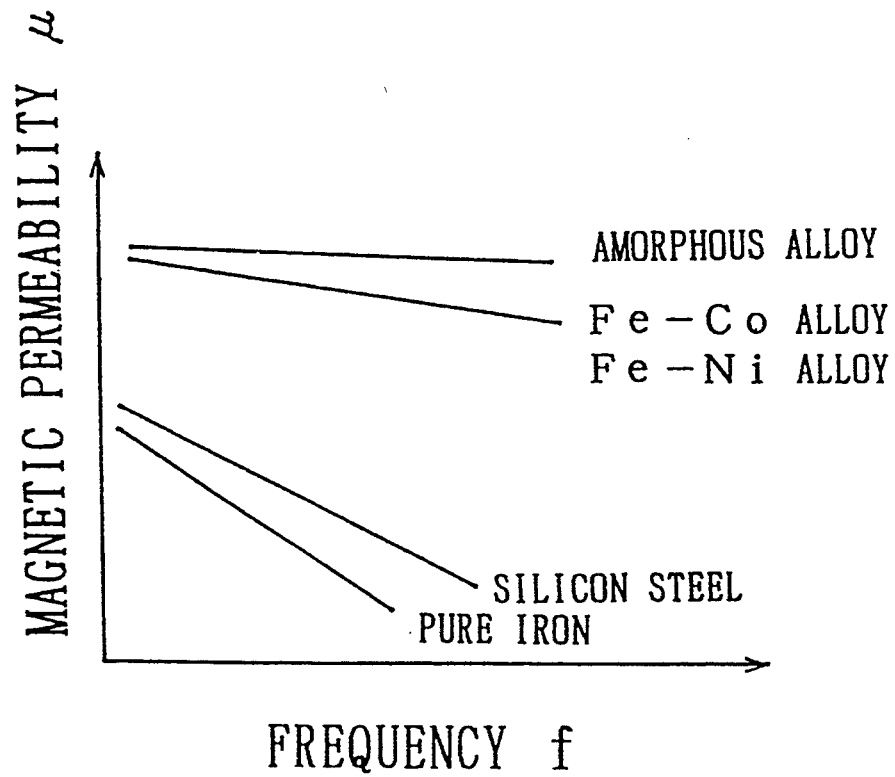
FIG. 5 is a graph showing the relationship between a frequency and a magnetic permeability for the material using for the first and second embodiments of the direct current motor according to the present invention.

FIG. 5 is a characteristic curve showing the relationship between a magnetic permeability and a frequency for several magnetic materials. When designing a motor, it is general to select a low magnetic permeability material.

According to FIG. 3, assuming that the magnitude of a magnetic field is determined in the order of the points a, b, c, d, and e, the level of the magnetic flux density is also determined, accordingly. Since the magnitude of the magnetic field at the space 9 is relatively low in the small size motor, when designing a small size motor, it is required for an optimum design to select a magnetic material in which a comparatively large magnetic flux density can be obtained even if the magnitude of the magnetic field applied thereto is low.

In the magnetic materials shown in FIG. 3, a pure iron and a silicon steel, each of which is a low carbon steel, are capable of obtaining a large magnetic flux density if a the magnetic field of large magnitude is applied thereto. However, when designing the motor under the condition of applying a magnetic field of small magnitude, it is possible to select Fe-Co alloy, Fe-Ni alloy or amorphous alloy shown in FIG. 3 as the material of the case i so as to meet with the design value of the magnitude of the magnetic field.

Furthermore, if a magnetic material with an excellent alternating current characteristics, for example, Fe-Co alloy, Fe-Ni alloy or amorphous alloy, as will be understood from FIGS. 4 and 5, is selected as a magnetic material of the case 1 so as to meet with the design value of the magnitude of the magnetic field, It is available to an optimum design of a high efficiency motor.

Figure 6:
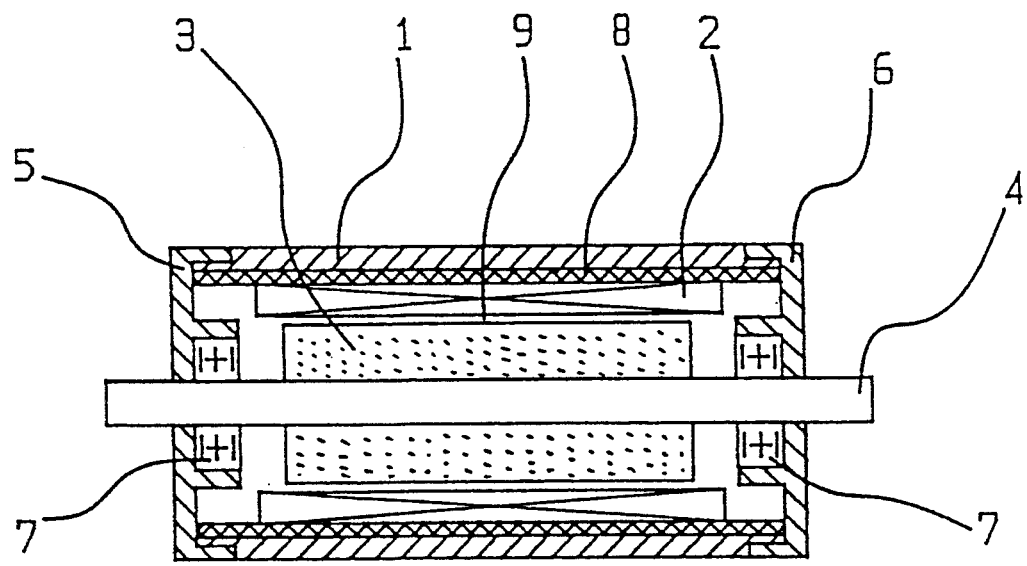
FIG. 6 is a sectional view of a second embodiment of the present invention.
Figure 7:
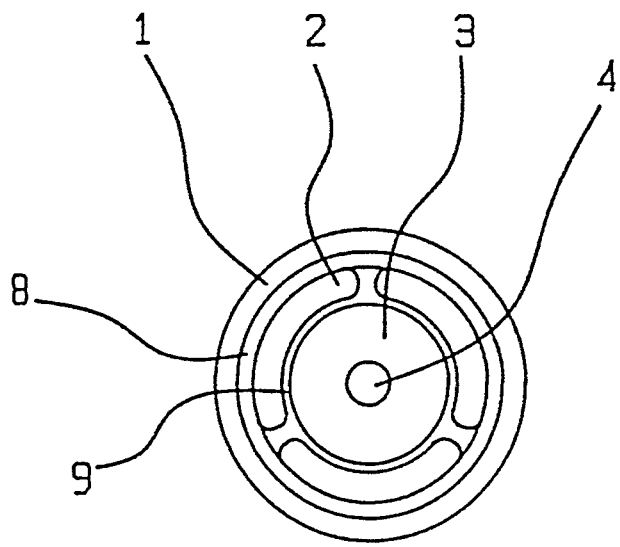
FIG. 7 is a plane view of the second embodiment of the direct current motor of the present invention.

FIG. 6 is a sectional view of a second embodiment of the direct current motor of the present invention. FIG. 7 is a plane view of the second embodiment of the direct current motor of the present invention.

In FIGS. 6 and 7, an outer section or case 1 is made of a magnetic material of a high saturation magnetic flux density and an inner section or case 8 is fixed to the inner circumference surface of the case 1. The inner case 8 is made of a magnetic material of a high magnetic permeability. There are two layers. That is, the case 1 is an outer surface portion and the case 8 is an inner surface portion.

Flange 5 and flange 6 are fixed to the case 1. The bearings 7 are secured to the flanges 5 and 6. The shaft 4 is supported by the bearings 7. The coils 2 are arranged along the inner circumference surface of the case 8 and are fixed thereto. The magnet 3 is secured to the shaft 4 so as to be spaced a cylindrical space 9 to the coils 2. The coils 2 are composed of three air-core coils wound coaxially. The coils may be a plurality of air-core coils wound coaxially or cylindrical air-core coils wound in a distributed winding.

FIG. 3 shows the magnetic characteristic curves of a plurality of magnetic materials. When designing a motor, a high saturation magnetic flux density material is generally selected as the magnetic materials.

FIG. 4 is a characteristic curve showing the relationship between a frequency and an iron loss for a plurality of magnetic materials. When designing a motor, it is general to select a low iron loss material.

FIG. 5 is a characteristic curve showing the relationship between a magnetic permeability and a frequency for several magnetic materials. When designing a motor, it is general to select a low magnetic permeability material.

According to FIG. 3, assuming the magnitude of a magnetic field is determined in the order of the points a, b, c, d, and e, the level of the magnetic flux density is also determined, accordingly. Since the magnitude of the magnetic field at the space 9 is relatively small in the small size motor, when designing a small size motor, it is required for an optimum design to select a magnetic material in which a comparatively large magnetic flux density happens even if the magnitude of the magnetic field applied thereto is small.

In the magnetic materials shown in FIG. 3, a pure iron and a silicon steel, each of which is a low carbon steel, are capable of obtaining a large magnetic flux density when a large magnitude magnetic field is applied thereto. However, when designing the motor under the condition of a small magnitude magnetic field, it is possible to select Fe-Co alloy, Fe-Ni alloy or Amorphous alloy shown in FIG. 3 as the material of the case I so as to meet with the design value of the magnitude of the magnetic field.

Furthermore, if a magnetic material with an excellent alternating current characteristics, for example, Fe-Co alloy, Fe-Ni alloy or amorphous alloy, as will be understood from FIGS. 4 and 5, is selected as a magnetic material of the case 1 so as to meet with the design value of the magnitude of the magnetic field, it is available to an optimum design of a high efficiency motor.

Figure 8:
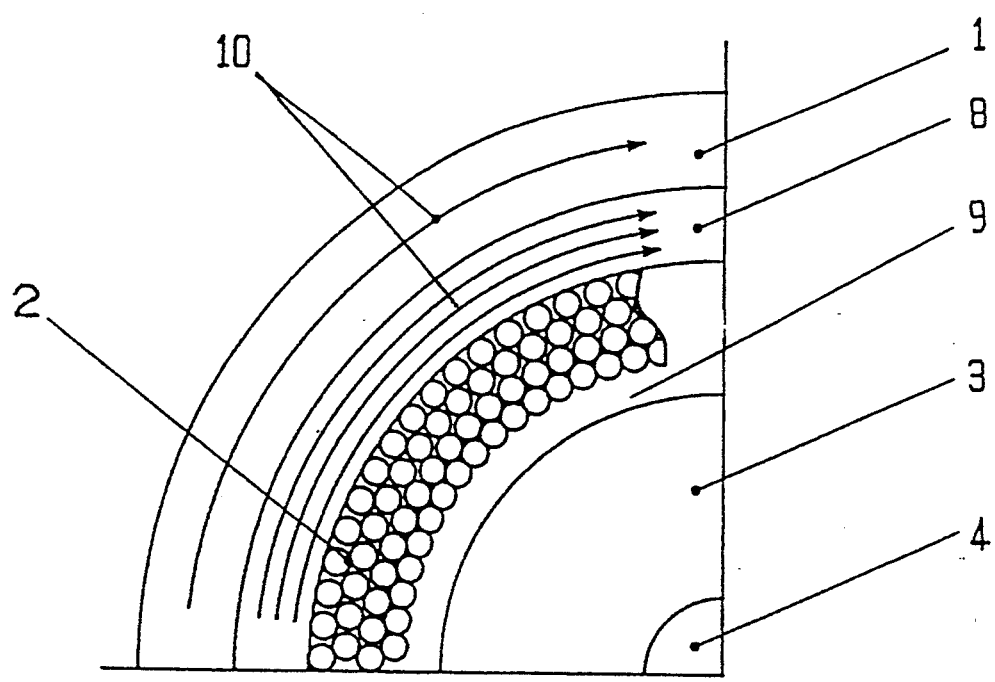
FIG. 8 is a partial enlarged view of FIG. 7 showing the second embodiment of the direct current motor of the present invention.
Figure 9:
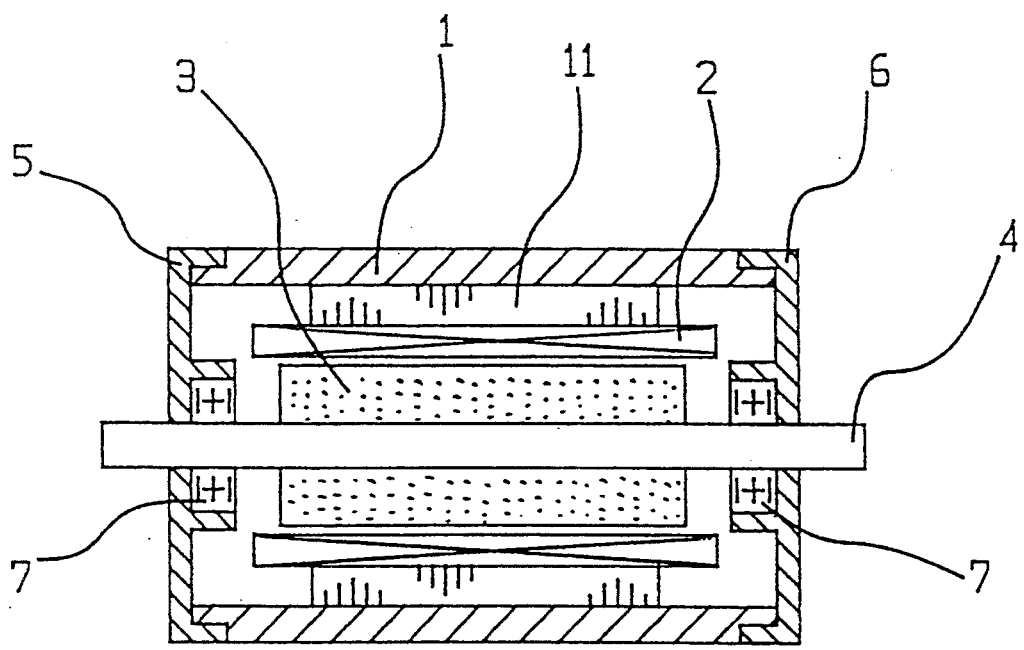
FIG. 9 is a sectional view of the conventional stationary coil type direct current motor.
Figure 10:
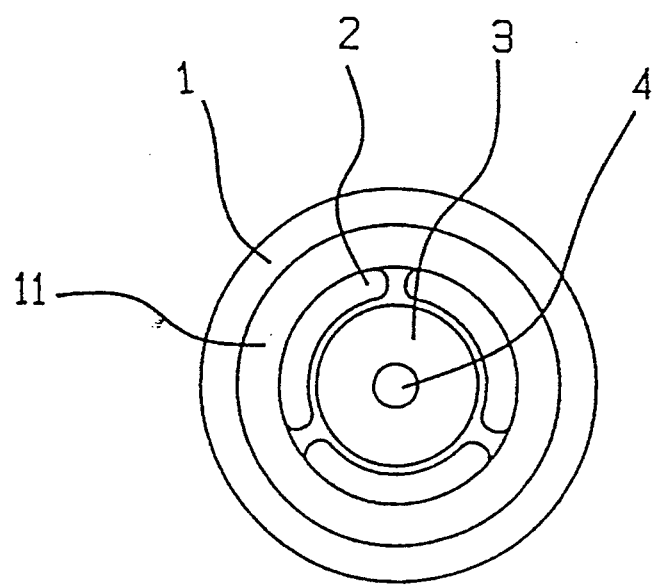
FIG. 10 is a plane view of the conventional stationary coil type direct current motor.

However, in a magnetic material, as will be understood from FIGS. 3 and 4, there is an antinomic relationship between high magnetic flux density characteristics and iron loss characteristics. FIG. 8 is a partial enlarged view of the plane view shown in FIG. 7 of the second embodiment. The case 1 is made of a magnetic material of a high saturation magnetic flux density and the case 8 is made of a magnetic material of a high magnetic permeability. The case 8 is a cylindrical form and is secured to the inner circumference surface of the case 1 to constitute a two-layer structure. That is, the case 1 is the outer peripheral portion (outer layer) and the case 8 is the inner peripheral portion (outer layer). The energizeable coils 2 are arranged along the inner circumference surface of the case 8 and fixed thereto. The magnet 3 is secured to the shaft 4 so as to define an annular space 9 between the magnet 3 and the coils 2. The coils 2 are three air-core coils wound coaxially. The coils may be a plurality of air-core coils wound coaxially or cylindrical air-core coils wound in a distributed winding. The shaft 4 is supported by the bearings 7 as illustrated in FIG. 6. The magnetic flux 10 from the magnet 3 passes through the space 9, the case 8, the case 1, the case 8 and the space 9, and returns to the magnet 3.

The case 1 is located farther from the magnet 3 as compared with the position of the case 8 and the case 8 is located nearer the magnets 3 as compared with the case 1. The magnetic flux density becomes larger in the case closer to the magnet 3. Therefore, as shown in FIG. 8, the amount of magnetic flux 10 is small in the case 1 and is large in the case 8. Furthermore, as the alternating frequency increases, the amount of magnetic flux 10 in the case 1 is liable to become small while that in the case 8 is liable to become large. This is a magnetic skin effect.

As to the magnetic flux 10 produced by the electric current flowing in the coils 2, since there is a lot of magnetic flux which is linked with the coils 2 at the position close to the coils 2, the amount of magnetic flux in the case 1 is less and that in the case 8 is large.

When the current flows through the motor to operate the same, the alternating frequency of the magnetic flux 10 shown in FIG. 8 is extremely low at the time of the start of the motor and the iron loss is small. Consequently, it is possible to select a magnetic material which is small in a magnetic permeability from the materials shown in FIG. 5. However, since large current flows at the time of the start of the motor to increase the magnitude of the magnetic field, a high saturated magnetic flux density material shown in FIG. 3, for example, low carbon steel which is a high machinability material or pure iron which is a typical soft magnetic material, can be selected for the case 1 as illustrated in FIGS. 6, 7 and 8, respectively. When the rotational speed of the motor becomes high after the start of the motor, the alternating frequency of the magnetic flux 10 shown in FIG. 8 becomes high, so that the iron loss shown in FIG. 4 increases. Therefore, it is suitable to select a magnetic material of a high magnetic permeability form the material shown in FIG. 5. However, since the magnitude of the current decreases at the time of the high rotational speed operation of the motor, the magnitude of the magnetic field becomes small. Consequently, a magnetic material having an optimum design value should be selected from among the materials characterized by a comparatively high saturation magnetic flux density material even in the condition of a weak magnetic field, for example, Fe-Co alloy, Fe-Ni alloy and amorphous alloy.

In the stationary coil type direct current motor according to the present invention, the motor comprises a cylindrical case made of a magnetic material characterized by a high saturation magnetic flux density and a high magnetic permeability, a shaft supported by said case, a magnet secured to said shaft, and a plurality of energizeable coils which are fixed to an inner surface of said case and are spaced from said magnet.

Furthermore, in a stationary coil type direct current motor, the motor comprise a case having an outer layer made of a magnetic material characterized by a high magnetic flux density, that is, a high saturation level of a magnetic flux density, and an inner layer made of a magnetic material of a high magnetic permeability, that is, a less iron loss, a shaft supported by said case, a magnet secured to said shaft, and a plurality of coils which are fixed to an inner surface of said case and are spaced from said magnet along the circumference. Therefore, the following effects are expected;

1) Since no laminated iron core is required, down sizing of motor is expected.

2) Since the motor case which forms part of the magnetic circuit is formed of one or two layers composed of a high saturation magnetic flux density material which is not liable to saturate in magnetic flux and a high magnetic permeability material with less iron loss, a high efficiency direct current motor with less iron loss and which is small in size can be realized.

3) Specially, this invention is effective for small size high speed motors.

What is claimed is

1. A direct current motor comprising:
a cylindrical case having an outer layer made of a magnetic material of a high saturation magnetic flux density, and an inner layer fixed to an inner surface of said outer layer and made of a magnetic material of a high magnetic permeability;
a shaft supported by said case;
a magnet secured to said shaft; and
a plurality of coils fixed to an inner surface of said inner layer of said case and spaced from said magnet.

2. A direct current motor as claimed in claim 1, wherein the outer layer is made of a soft magnetic material composed of a low carbon steel and the inner layer is made of Fe-Co alloy.

3. A direct current motor as claimed in claim 1, wherein the outer layer is made of a soft magnetic material composed of a low carbon steel and the inner layer is made of Fe-Ni alloy.

4. A direct current motor as claimed in claim 1, wherein the outer layer is made of a soft magnetic material composed of a low carbon steel and the inner layer is made of an amorphous alloy.

5. A direct current motor comprising: a case having an outer case section made of magnetic material having a high saturation magnetic flux density, and an inner case section disposed on an inner side of the outer case section and made of magnetic material having a high magnetic permeability; a shaft rotatably supported by the case; magnet means carried by the shaft for creating a first magnetic field; and coil means carried by the case and disposed on an inner side of the inner case section in spaced relation from the magnet means and operative when energized for creating a second magnetic field which coacts with the first magnetic field to effect rotation of the shaft.

6. A direct current motor according to claim 5; wherein the outer and inner case sections extend at least a major part of the length of the case.

7. A direct current motor according to claim 5; wherein the case has a cylindrical shape.

8. A direct current motor according to claim 5; wherein the case has a two-layer structure, the outer case section constituting an outer layer of the case and the inner case section constituting an inner layer of the case.

9. A direct current motor as claimed in claim 8; wherein the outer layer is made of a soft magnetic material composed of a low carbon steel and the inner layer is made of Fe-Co alloy.

10. A direct current motor as claimed in claim 8; wherein the outer layer is made of a soft magnetic material composed of a low carbon steel and the inner layer is made of Fe-Ni alloy.

11. A direct current motor as claimed in claim 8; wherein the outer layer is made of a soft magnetic material composed of a low carbon steel and the inner layer is made of an amorphous alloy.

12. A direct current motor as claimed in claim 5; wherein the outer case section is made of a soft magnetic material composed of a low carbon steel and the inner case section is made of Fe-Co alloy.

13. A direct current motor as claimed in claim 5; wherein the outer case section is made of a soft magnetic material composed of a low carbon steel and the inner case section is made of Fe-Ni alloy.

14. A direct current motor as claimed in claim 5; wherein the outer case section is made of a soft magnetic material composed of a low carbon steel and the inner case section is made of an amorphous alloy.

15. A direct current motor as claimed in claim 5; wherein the magnet means comprises a permanent magnet.

16. A direct current motor as claimed in claim 5; wherein the coil means comprises a plurality of energizeable coils.

* * * * *